(12) United States Patent
Galvin et al.

(10) Patent No.: US 8,458,776 B2
(45) Date of Patent: Jun. 4, 2013

(54) LOW-LATENCY PEER SESSION ESTABLISHMENT

(75) Inventors: Tom Galvin, Amherst, NH (US); David Steere, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 840 days.

(21) Appl. No.: 12/603,401

(22) Filed: Oct. 21, 2009

(65) Prior Publication Data

US 2011/0093710 A1   Apr. 21, 2011

(51) Int. Cl.
*H04L 9/30* (2006.01)
*H04L 29/02* (2006.01)

(52) U.S. Cl.
USPC ................................. 726/5; 726/30

(58) Field of Classification Search
None
See application file for complete search history.

(56) References Cited

U.S. PATENT DOCUMENTS

| | | |
|---|---|---|
| 6,769,060 B1 | 7/2004 | Dent |
| 7,127,613 B2 | 10/2006 | Pabla et al. |
| 7,181,620 B1 | 2/2007 | Hur |
| 2003/0105812 A1 | 6/2003 | Flowers et al. |
| 2003/0217165 A1 | 11/2003 | Buch et al. |
| 2004/0034776 A1 | 2/2004 | Fernando |
| 2004/0054885 A1 | 3/2004 | Bartram et al. |
| 2008/0195865 A1 | 8/2008 | Nikander |

FOREIGN PATENT DOCUMENTS

| | | |
|---|---|---|
| CN | 101465725 A | 6/2009 |
| EP | 1906586 A1 | 4/2008 |
| EP | 1916816 | 4/2008 |
| WO | 03092218 A1 | 11/2003 |
| WO | 2011049712 A2 | 4/2011 |

OTHER PUBLICATIONS

Design and Implementation of a PKI-Based End-to-End Secure Infrastructure for Mobile E-Commerce. Chanson et al. Kluwer Academic Publishers(2002).*
"International Search Report", Mailed Date: Jun. 20, 2011, Application No. PCT/US2010/050282, Filed Date: Sep. 24, 2010, pp. 9.
Aiello et al., "Efficient, DoS Resistant, Secure Key Exchange for Internet Protocols", Nov. 18-22, 2002, Washington, DC USA, http://citeseerx.ist.psu.edu/viewdoc/download?doi=10.1.1.15.2610&rep=rep1&type=pdf.
Office Action cited in related Chinese Application No. 201080047316.6 Dated: Sep. 21, 2012 pp. 1-2.

(Continued)

*Primary Examiner* — Venkat Perungavoor
(74) *Attorney, Agent, or Firm* — Microsoft Corporation

(57) ABSTRACT

A source device and a target device may endeavor to form a secure communication session whereby encrypted messages may be transmitted over an untrusted network, such as the internet. However, the exchange of many messages in the establishment of the communication session may involve considerable latency and computational resources, particularly in scenarios featuring many communication sessions (e.g., peer-to-peer communication sessions.) Techniques for initiating a communication session may be devised that enables the initiation of a communication session with only two exchanged messages, or even with a single message transmitted from the source device to the target device. Some embodiments of these techniques may also permit the inclusion of advantageous security features, such as authentication via public certificate to detect man-in-the-middle attacks and the inclusion of nonces to detect replay attacks, without increasing the number of messages involved in the initiation of the communication session.

20 Claims, 8 Drawing Sheets

OTHER PUBLICATIONS

Yalagandula, Praveen, et al. "Transparent Mobility with Minimal Infrastructure" http://citeseerx.ist.psu.edu/viewdoc/summary?doi=10.1.1.21.9047 Technical Report TR-01-30 University of Texas—Austin Published Date: Jun. 2001, pp. 1-14.
This action was cited in an IDS dated Nov. 27, 2012.
Response to Office Action cited in related Chinese application No. 201080047316.6, Dated: Dec. 18, 2012, pp. 1-5.
Notice of Allowance cited in related Chinese application No. 201080047316.6, Dated: Jan. 16, 2013, pp. 1-3.
European Search Report cited in European application No. 10825382.4, Dated: Feb. 26, 2013, pp. 1-10.
Chanson, Samuel T., et al. "Design and Implementation of a PKI-Based End-to-End Secure Infrastructure for Mobile E-Commerce", http://link.springer.com/article/10.1023%FA%3A1015160717604?LI=true. p. 242, Paragraph 4, p. 246, Paragraph 5.2.2 Published Date Jan. 1, 2001, Retrieved date: Feb. 15, 2013, pp. 1-20

* cited by examiner

LOW-LATENCY PEER SESSION ESTABLISHMENT

BACKGROUND

In many computing scenarios, two or more devices that are mutually accessible (e.g., over a wired or wireless network) may endeavor to establish a communication session that is encrypted to deter eavesdropping or the leak of sensitive information, and/or authenticated such that each device may verify that received messages were generated by the other device. For example, an asymmetric cryptographic key exchange algorithm, such as the RSA algorithm, may be implemented to permit two devices to exchange public keys for a session, which may be used in conjunction with the corresponding (and retained as secret) private keys in order to enable encrypted and authenticated communication during a communications session.

When two devices endeavor to establish such a communication session, a handshake protocol may be used to identify supported protocols and to exchange keys. For example, the Transport Layer Security (TLS) protocol may be implemented by each device to initiate the handshake; to disclose and choose encryption algorithms, compression algorithms, public keys, and authentication certificates; and to signal a commencement of communication using the negotiated algorithms. Once the details of the communication session are determined, the devices may establish the secure connection and may initiate communication over the encrypted channel.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Many handshake processes, including the Transport Layer Security (TLS) protocol, permit extensive robustness in the negotiation of the logistics of the communication session. However, this robustness may impose various costs, such as implementation complexity and the ensuing potential for security flaws. Also, the devices may have to exchange several messages to complete the negotiation, where each message may involve a round trip over the network connecting the devices. This exchange of information may be slow or prone to failure, especially over low-bandwidth, high-latency, and/or unreliable connections (e.g., low-reception cellular networks that may involve dropped messages.)

An alternative technique involves the exchanging of a comparatively small number of messages in order to establish the communication session. One such set of techniques, disclosed herein, involves the delivery of a single set of information (e.g., a single message) from the source device to the target device representing a session invite, where the message specifies one or more candidate addresses of the source device and a session key generated by the source device. The client device may receive the session invite, and, if choosing to permit the establishment of a communication session (and verifying the details of the session invite, e.g., authenticating the device and/or user as having initiated the communication session), may reply with its own session key, as well as one or more candidate addresses of the target device. The source device and the target device each use the source session key and the target session key to establish a session key that both devices may use for the session. Having exchanged a sufficient set of information to enable a secured communication session, the source device may initiate the communication session, and the target device may reply in kind. Thus, the secure communication session may be established with a reduced (and perhaps minimum) number of exchanged messages between the device, thereby reducing latency and the possibility of a failure to establish the communication session. Other security features may be implemented and included in this scheme. For example, it may be feasible to obscure the actual addresses of the source device and the target device until the secure communication session is established; e.g., different (such as anonymized) addresses may be used during the handshake process, during which the devices may securely transmit other (non-anonymized) addresses of each address to be used during the communication session.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
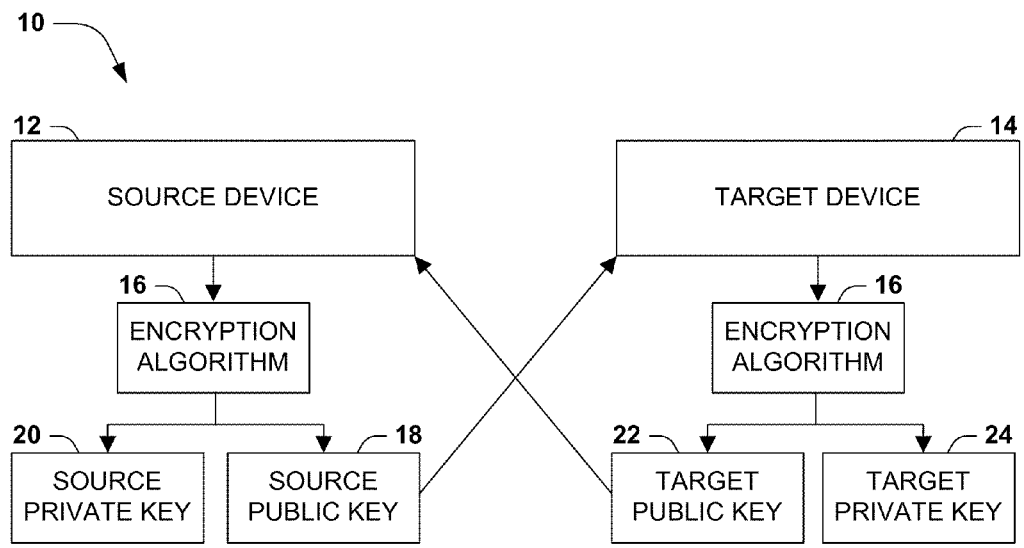
FIG. 1 is an illustration of an exemplary scenario featuring the generation and exchange of an asymmetric cryptographic key pair between a source device and a target device

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many scenarios in the field of computing involve an establishment of a communication session among peer devices, such as two computers connected via the internet or two wireless communications devices connected via a wireless local network. In these scenarios, the devices may endeavor to establish a communications session via a secure channel, such that communication between the devices is encrypted. Moreover, the devices may endeavor to encrypt the data in a manner that avoids a mutually shared password, which may be difficult to exchange securely before the secure communication session is established. Thus, the devices might be capable of communicating over the physical network by sending unencrypted messages, but may wish to devise an "overlay" network, whereby encrypted messages may be sent and received over the physical network, but the message may be automatically encrypted and decrypted by each device, thereby presenting to the applications executing on each device a virtual network between the devices that is secure from eavesdropping.

Figure 2:
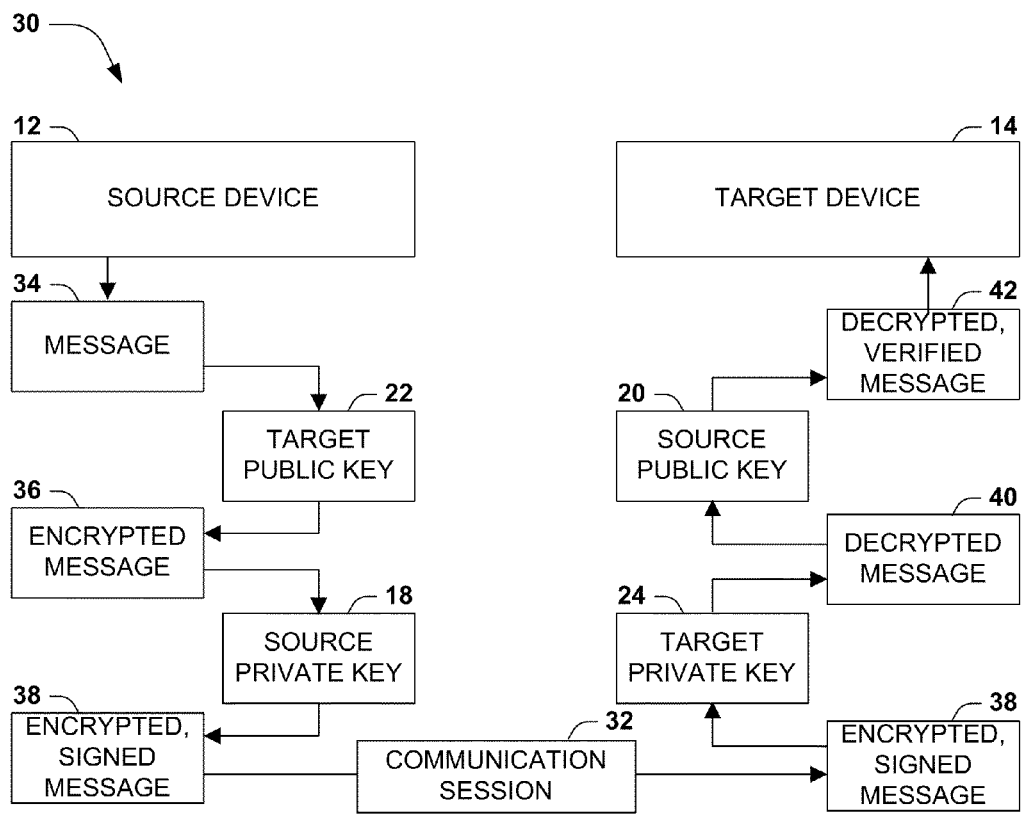
FIG. 2 is an illustration of an exemplary scenario featuring the use of an asymmetric cryptographic key pair to exchange messages between a source device and a target device over a secure communication session.

FIGS. 1-2 together presents an exemplary scenario featuring a source device 12 (e.g., a client initiating a request for a communication session) and a target device 14 (e.g., a server receiving the request to initiate the communication session) that endeavor to establish and utilize a communication session in a secure manner. In the exemplary scenario 10 of FIG. 1, the source device 12 and the target device 14 generate and exchange some information involved in securing the communication session through the use of an encryption algorithm 16 featuring asymmetric key cryptography, such as the RSA algorithm. This algorithm is configured to generate a cryptographic key pair comprising a public key and a private key having two properties: the private key cannot be identified using the public key; and a message encrypted with the public key can only be decrypted using the private key. As an additional advantage, a message may be cryptographically "signed" using the private key, and the signature may be verified using the public key, thus verifying the author of the message as the holder of the private key (and verifying the contents of the message.) In preparation for the secure communication session, the source device 12 may utilize the encryption algorithm 16 to generate a source private key 20 and a source public key 18, and the target device 14 may utilize the encryption algorithm 16 to generate a target public key 22 and a target private key 24. The source device 12 may then transmit the source public key 18 to the target device 14 while retaining the source private key 20 in secret, and the target device 14 may transmit the target public key 22 to the source device 12 while retaining the target private key 24 in secret.

FIG. 2 presents an exemplary scenario 30 featuring the use of these key pairs by the source device 12 and the target device 14 to exchange messages in a secure manner that deters eavesdropping, while also avoiding the security difficulties of shared passwords (e.g., the difficulty of exchanging a shared password to encrypt a communication session before the communication session is established) and permitting the verification of the author and contents of a particular message. As per the exemplary scenario 10 of FIG. 1, the source device 12 has already generated a source public key 18 that has been shared with the target device 14 and a source private key 20 that is retained in secret, and the target device 14 has already generated a target public key 22 that has been shared with the source device 12 and a target private key 24 that is retained in secret. In this exemplary scenario 30, the source device 12 and the target device 14 now engage in a communication session 32 across which a message 34 may be securely transmitted from the source device 12 to the target device 14. For example, the communication session 32 may be established over an untrusted network, such as the internet, where eavesdropping may occur; accordingly, the source device 12 and the target device 14 therefore deliver only encrypted messages over the communication session 32 that may not be easily read, altered, or forged by a third party.

In this exemplary scenario 30, the source device 12 first encrypts the message 34 with the target public key 22 to produce an encrypted message 36. The source device 12 also signs the encrypted message 36 with the source private key 20 to produce an encrypted and signed message 38. This encrypted and signed message 38 may be transmitted to the target device 14 over the communication session 32. Even if a third party may eavesdrop on the communication session 32 and may read the encrypted and signed message 38, the intercepted message 34 cannot be decrypted, as the third party does not have access to the target private key 24. By contrast, when the target device 14 receives the encrypted and signed message 38, the target device 14 uses the target private key 24 to produce a decrypted message 40. Additionally, the target device 14 may use the source public key 18 to verify the author of the decrypted message 40 (i.e., to verify that the decrypted message 40 was generated by a device having access to the source private key 20, such as the source device 12) and/or to verify that the contents of the decrypted message 40 have not been altered by a third party who may be eavesdropping on the communication session 32. As a result of this exemplary scenario 30, the target device 14 receives a decrypted, verified message 42 that has been transmitted over an untrusted channel (such as the internet) with a verifiably low probability of interception and/or tampering by a third party.

The techniques illustrated in the exemplary scenarios of FIGS. 1-2 may be used to exchange encrypted messages over a secure communication session, but the manner of exchanging the public key information in order to establish the communication session may involve additional considerations. As a first example, it may be desirable for one device to authenticate the other device, so that a third party may not simply impersonate the other device at the beginning of the key exchange. For example, a third party might intercept a request to establish the communication session 32 from a source device 12, and may engage in key exchange with the source device 12 while impersonating the target device 14. Moreover, in a "man-in-the-middle attack," the third party might also impersonate the source device 12 and request to establish a second communication session 32 with the target device 14. If successful in initiating both communication sessions 32, the third party might pass all messages 34 received from one communication session 32 into the other communication session 32, thereby presenting the appearance of a secure communication channel 32 between the source device 12 and target device 14, but having full access to the messages 34 exchanged therethrough. In order to reduce this likelihood, the source device 12 may endeavor to authenticate the target device 14, e.g., by testing the identity of the target device 14 against a public certificate received from a trusted source and identifying the target device 14, which a third party may not be able to fulfill.

As a second example, a third party who cannot decrypt the messages may still interfere with the source device 12 and/or the target device 14 through a "replay attack," where the third party captures one or more encrypted and signed messages 38 transmitted to the communication session 32 and later retransmits them to the receiving device. The receiving device might fail to recognize the replayed message as a duplicate of a previously received message, and might act upon it. For example, if the source device 12 sends to the target device 14 a request to establish a communication session 32 that authenticates the source device 12, a third party might capture the message and retransmit it to the target device 14 from a different address. Even if the third party cannot decrypt the contents of the request, the retransmission of the request (including the encrypted credentials of the source device 12) from the separate address might be successfully accepted by the target address 14, thereby prompting the target device 14 to establish a communication session 32 with the third party impersonating the source device 12. In order to reduce the threat of such security risks, the source device 12 and/or the target device 14 may include in various messages a "nonce," comprising a one-time identifier (often generated at random) that is used to render a distinguishing characteristic to a message 34, communication session 32, etc., such that a receiving device may identify retransmitted messages.

Due to these and other considerations, a particular manner of establishing communication sessions 32 between a source device 12 and a target device 14 may be devised involving not just the exchange of key information, but also related information. In many scenarios, this manner of establishing a communication session 32, sometimes referred to as a "handshake," may involve an exchange of considerable information in a well-structured and interactive manner.

Figure 3:
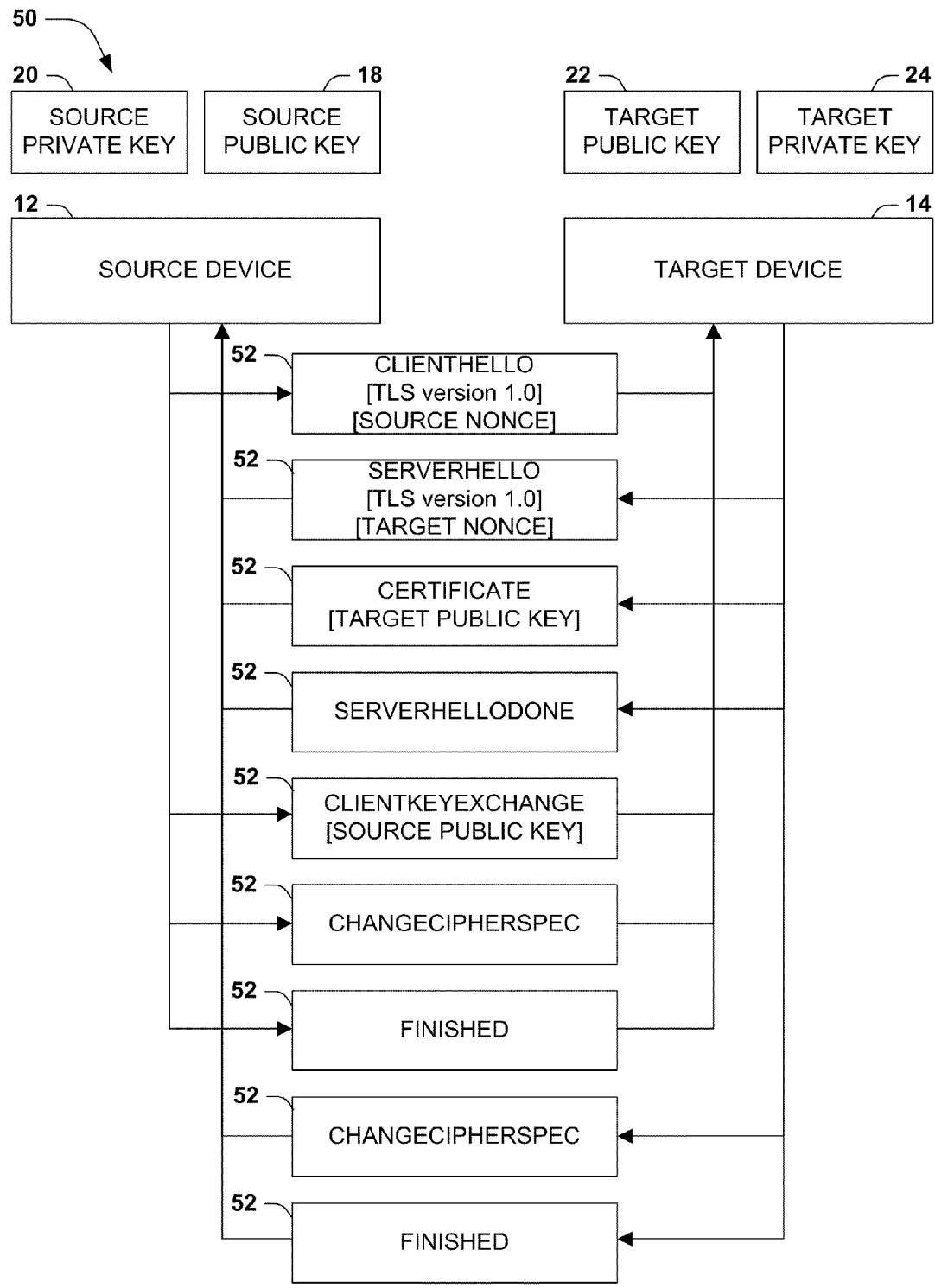
FIG. 3 is an illustration of a handshake interaction of a source device and a target device according to an exemplary version of a Transport Layer Security (TLS) protocol.

FIG. 3 presents an exemplary scenario 50 featuring a "handshake" establishment of a communication session between a source device 12 and a target device 14 that is used in the Transport Layer Security (TLS) cryptographic protocol. The source device 12 again generates a source public key 18 and a source private key 20, while the target device 14 generates a target public key 22 and a target private key 24. According to one comparatively simplified "handshake" interaction in accordance with the TLS protocol, the source device 12 initiates the interaction by sending a message 52 to the target device 14 encoded as a "ClientHello" message, which identifies the version of TLS used by the client 12 and a source nonce. The target device 14 responds with a "ServerHello" message 52 also identifying the version of TLS used by the server 12 and a target nonce. The target device 14 also sends a "Certificate" message 52, which, in some scenarios, may include the target public key 22, and then sends to the source device 12 a "ServerHelloDone" message 52. The source device 12 replies with a "ClientKeyExchange" message 52, featuring the source public key 18, and then sends a "ChangeCipherSpec" message 52, indicating that subsequent messages 52 sent by the source device 12 are encrypted according to the exchanged credentials. The source device 12 finally sends a "Finished" message 52, indicating that the source device 12 has completed its portion of the handshake interaction. The target device 14 responds with a similar "ChangeCipherSpec" message 52 and a "Finished" message 52, thereby completing the handshake interaction and establishing the secure communication channel 32.

In this comparatively simplified handshake interaction, the source device 12 and the target device 14 exchange a considerable amount of information. This interaction may involve the exchange of nine messages 52, each having a specific format utilized by the sending device and inducing a particular behavior in the receiving device. The complexity of the handshake interaction might raise the probability of complications arising (e.g., unexpected or undesirable results if messages 52 are exchanged in an incorrect order, a failed delivery of a message 52, and opportunities for abuse by third parties.) Moreover, each message 52 involves a transmission delay over a network, giving rise to a significant amount of latency that may delay the establishment of the communication channel 32 between the source device 12 and the target device 14. While some techniques might be used to reduce the number of messages 52 exchanged (e.g., grouping sets of related messages 52 in the exemplary scenario 50 of FIG. 3 might reduce the number of exchanged messages to four), additional features of the communications channel (e.g., the negotiation of a particular TLS version and of a particular encryption algorithm 16) might further increase the number of messages 52 exchanged to complete the handshake. The generation, transmission, reception, decoding, and processing of such messages also imposes a computational burden on the source device 12 and the target device 14, and in scenarios where the number of connections may be large (e.g., peer-to-peer data transfer among a large set of peer devices, where a device may establish and maintain hundreds of connections on a dynamic basis), the delays and computational burdens of establishing the connections may scale out of an acceptable range.

Accordingly, it may be desirable to reduce the complexity of the handshake interaction in order to permit an establishment of the communication session 32 with desirably low latency and computational costs, while also enabling some of the features discussed herein (e.g., protection against man-in-the-middle attacks or replay attacks.) One technique for reducing latency involves reducing the number of messages 52 exchanged in the establishment of the communication session 32. For example, the handshake interaction might be devised to permit each device to deliver to the other device a single set of information defining its portion of the secure communication session 32, thereby permitting the communication session 32 to commence with a single exchange of messages 52.

Figure 4:
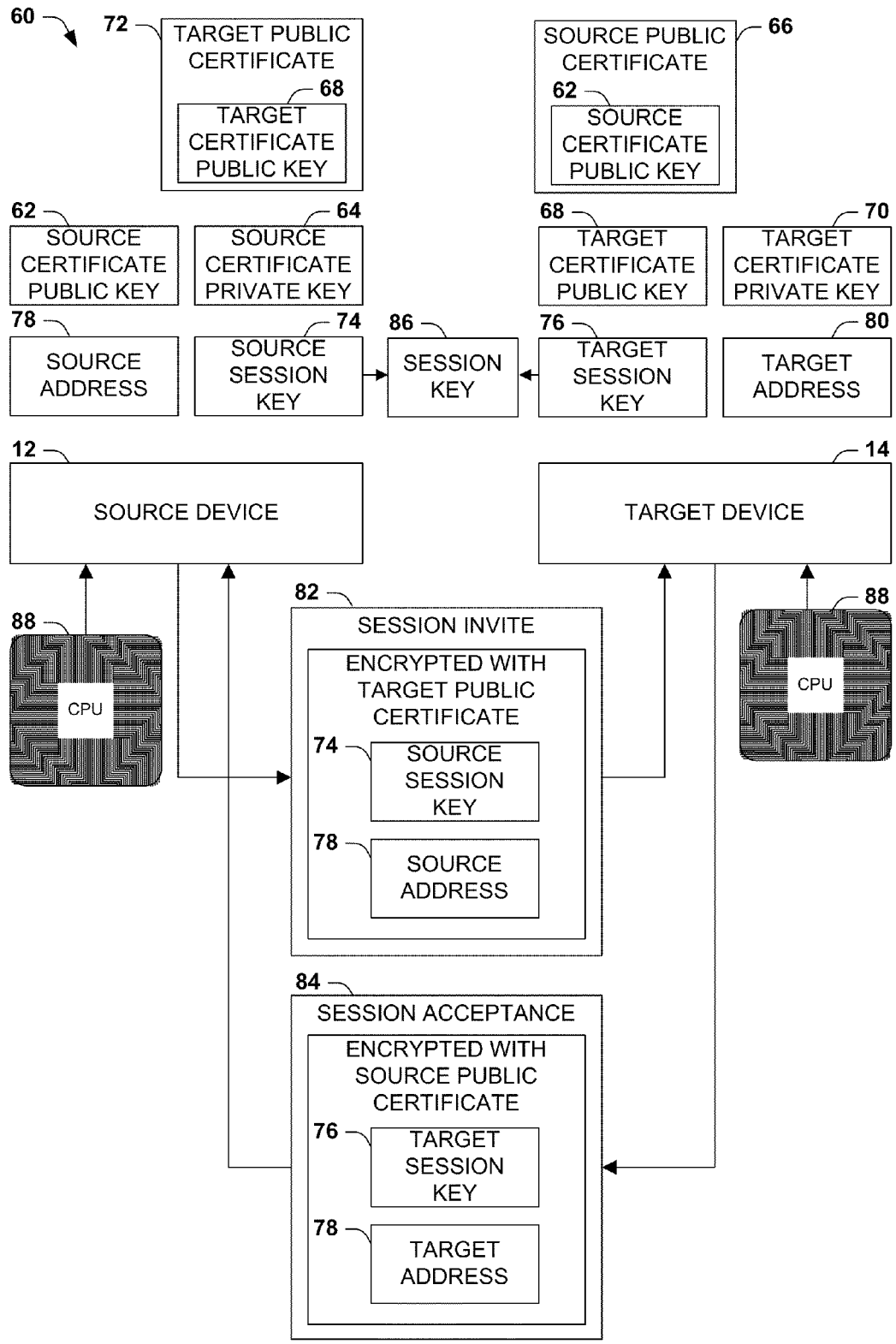
FIG. 4 is an illustration of a handshake interaction of a source device and a target device in accordance with the techniques presented herein.

FIG. 4 presents an exemplary scenario 60 featuring an embodiment of these techniques, wherein a source device 12 and a target device 14 might establish a communication session 32 with a single information exchange. For example, the source device 12 and the target device 14 may comprise computers having processors 88 and communicating over a wired or wireless communication network, such as the internet or a local area network (LAN.) In this exemplary scenario 60, the source device 12 may be identifiable by a source public certificate 66, and the target device 14 may be identifiable by a target public certificate 72. These public certificates may be maintained by a trusted server (e.g., an authentication server that is configured to store public certificates and to promote the authentication of devices by other devices), or might be exchanged in other ways. The source public certificate 66 might contain, e.g., a source certificate public key 62 that corresponds to a source certificate private key 64 that is retained in secret by a known and authenticated source device 12; and the target public certificate 72 might contain, e.g., a target certificate public key 68 that corresponds to a target certificate private key 70 that is retained in secret by a known and authenticated target device 14. The key pair involved in these public certificates might not be used by the device for encrypting messages 52 during a communication session 32 with the other device, but might be reserved for the authentication of the devices. The source device 12 may have access to the target public certificate 72 comprising the target certificate public key 68, and the target device 14 may have access to the source public certificate 66 comprising the source certificate public key 62. In addition, the source device 12 may have a source address 78 on a particular network, e.g., a TCP/IP address assigned for internet or LAN access, and the target device 14 may have a target address 80 on the same network, which may be used by each device to address messages 52 to the other device. For example, the target address 80 might be specified in the target public certificate 72, thereby authenticating the identity of a target device 14 if it is accessible at the target address 80 and in possession of the target certificate private key 70.

When the source device 12 receives (e.g., from a user) a request to initiate a communications session 32 with the target device 14, the source device 12 might initiate a handshake in the following manner. First, the source device 12 might generate a source session key 70, which is to be used to encrypt and decrypt messages 52 only for this communication session 32 with this target device 14. The source device 12 may prepare a session invite 82, comprising the source session key 74 and the source address 78, and may encrypt the message with the target certificate public key 68 within the target public certificate 72. The session invite 82 may then be transmitted to the target device 14 as a request to initiate the communication session 32.

When the target device receives the session invite 82, the target device may decrypt the session invite 82 using the target certificate private key 70, and may determine whether or not to accept the invitation to initiate the communication session 32. If the target device 14 accepts the invitation, the target device 14 may then generate a target session key 76. Using the source session key 74 and the target session key 76, the target device 14 might generate a session key 86 that may be used to encrypt the eventual communication session 32. For example, the session key 86 may comprise a symmetric key, such as a Rijndael key that is used both to encrypt and decrypt messages. The symmetric key may comprise, e.g., a simple concatenation of the source session key 74 and the target session key 76. After generating the target session key 76, the target device 14 may prepare a session acceptance 84, comprising the target session key 76 and the target address 80, which may be encoded with the source public certificate 66. The target device 14 may then transmit the session acceptance 84 to the source device 12. Upon receiving the session acceptance 84, the source device 12 may also generate a session key 86 using the source session key 74 and the target session key 76. The source device 12 may then initiate the communication session with the target address 14, encrypted with the session key 86, and may exchange messages over the communication session 32 as in the exemplary scenario 30 of FIG. 2. In this manner, the source device 12 and the target device 14 may exchange the relevant information for initiating the communication session 32 with only two messages 52, thereby reducing the latency and computational burdens of the handshake. Additionally, the use of the target public certificate 72 may facilitate the authentication to the source device 12 of the identity of the target device 14, while not involving an exchange of additional messages 52 in the handshake. Moreover, in a refinement of these techniques (not illustrated in FIG. 4), the latency of establishing the communication session 32 might be further reduced if the target device 14 initiates the communication session with the source device 12 upon receiving the session invite 82. In this embodiment, the session acceptance 84 may be sent within the established communication channel, thereby reducing the handshake to the exchange of a single message 52 and reducing the latency and computational burden of the handshake.

Figure 5:
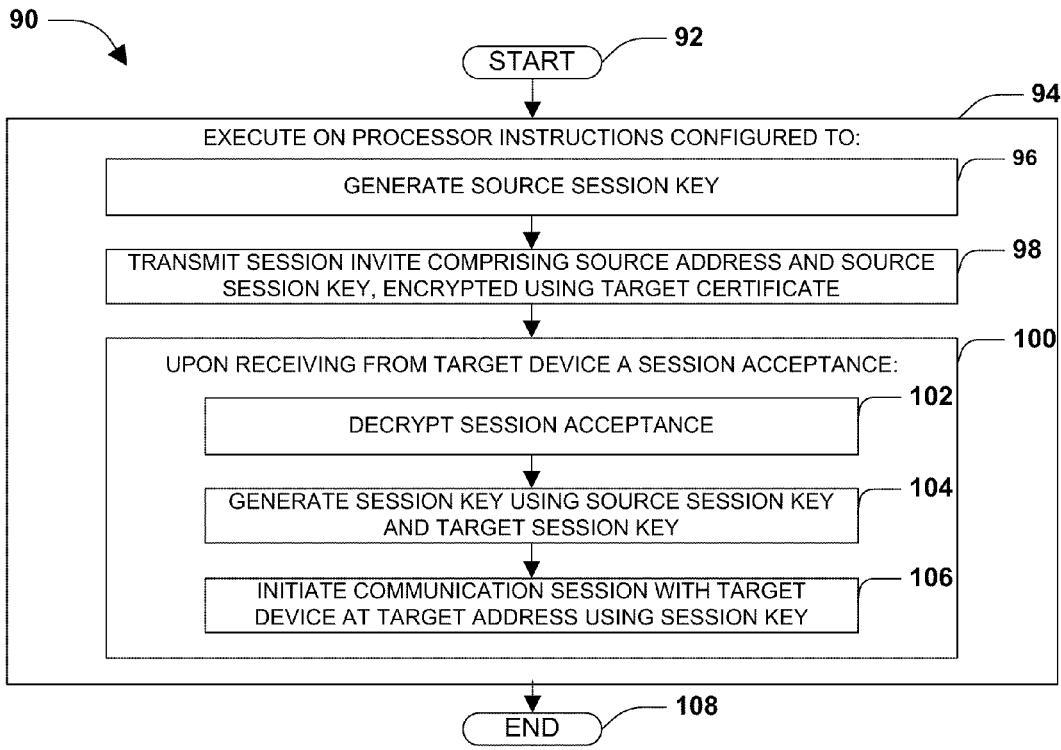
FIG. 5 is a flow chart illustrating an exemplary method of establishing a communication session by a source device with a target device.

FIG. 5 presents a first embodiment of these techniques, presented as an exemplary method 90 of establishing a communication session 32 by a source device 12 having a processor 88 and a source address 78, as well as a source public key 62 and a source private key 64. The source device 12 is therefore represented by a source public certificate 66 comprising the source public key 62. The communication session 32 is established with a target device 14 having a target public certificate 72 and a target address 80. The exemplary method 90 may be embodied, e.g., as a set of instructions stored in a memory of the source device 12. The exemplary 90 method begins at 92 and involves executing 94 on the processor 88 instructions configured to implement the techniques presented herein. In particular, the instructions may be configured to generate 96 a source session key. The instructions may also be configured to transmit 98 to the target device 14 a session invite 82 comprising the source address 78 and the source session key 74, where the session invite 82 is encrypted using the target public certificate 72 (e.g., a target certificate public key 68 included in the target public certificate 72.) The instructions may also be configured to, upon receiving 100 from the target device 12 a session acceptance 84 comprising a target address 80 and a target session key 76, decrypt 102 the session acceptance 84 using the source public certificate 66, and generate 104 the session key 86 using the source session key 74 and the target session key 76. Finally, the instructions may be configured to initiate 106 the communication session 32 with the target device 14 at the target address 80 specified in the session acceptance 84, where the communication session 32 is encrypted using the session key 86. Having exchanged key information with the target device 14 through the transmitting of the session invite 82 and the receiving of the session acceptance 84, the exemplary method 90 therefore establishes the communication session 32 with the target device 14 with a reduced number of messages 52, and so ends at 108.

Figure 6:
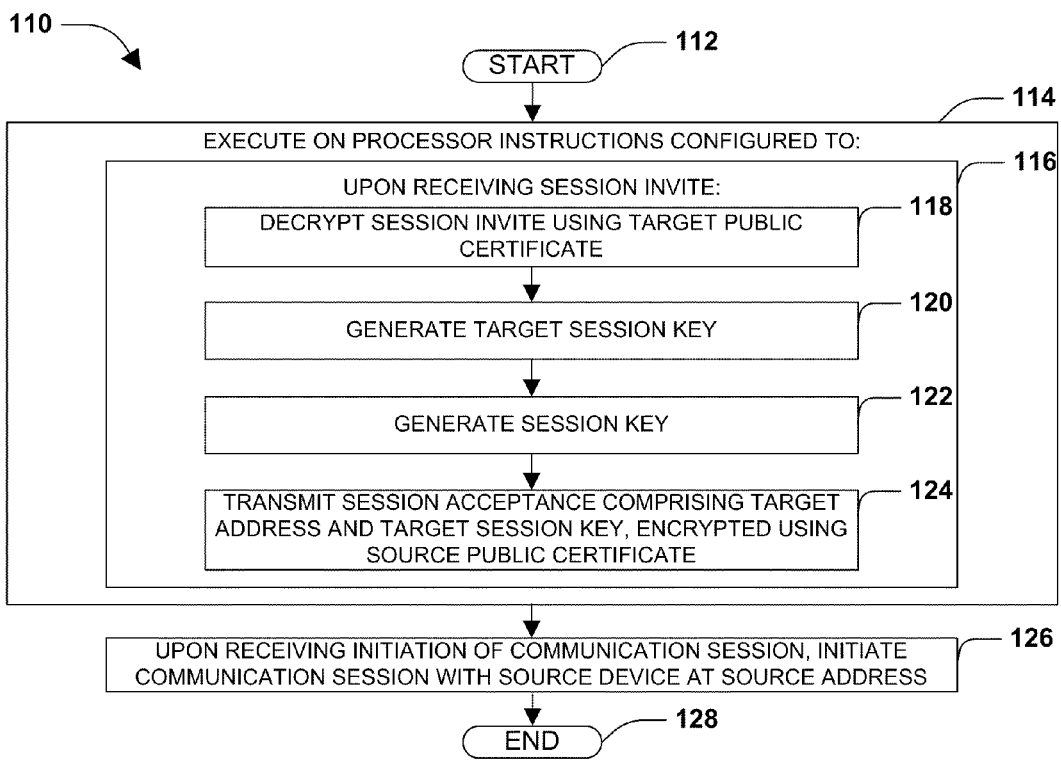
FIG. 6 is a flow chart illustrating an exemplary method of establishing a communication session by a target device with a source device.

FIG. 6 presents a second embodiment of these techniques, illustrated as an exemplary method 110 of establishing a communication session 32 by a target device 14 having a processor 88, a target public certificate 72, and a target address 80, with a source device 12 having a source public certificate 66. The exemplary method 110 may be embodied, e.g., as a set of instructions stored in a memory of the target device 14. The exemplary method 110 begins at 112 and involves executing 114 on the processor 88 instructions configured to implement the techniques presented herein. More specifically, the instructions may be configured to, upon receiving 116 from the source device 12 a session invite 82 comprising a source address 78 and a source session key 74, decrypt 118 the session invite 82 using the target public certificate 72, and generate 120 a target session key 76. Using the source session key 74 and the target session key 76, the instructions may be configured to generate 122 a session key 86. The instructions may also be configured to transmit 124 to the source device 12 a session acceptance 84, comprising the target address 80 and the target session key 76, where the session acceptance 84 is encrypted using the source public certificate 66. Finally, the instructions may be configured to, upon receiving from the source device 12 an initiation of a communication session 32, initiate 124 the communication session 32 with the source device 12 at the source address 76, where the communication session 32 is encrypted using the session key 86. Having exchanged key information with the source device 12 through the receiving of the session invite 82 and the transmitting of the session acceptance 84, the exemplary method 110 therefore establishes the communication session 32 with the source device 12 with a reduced number of messages 52, and so ends at 126.

Figure 7:
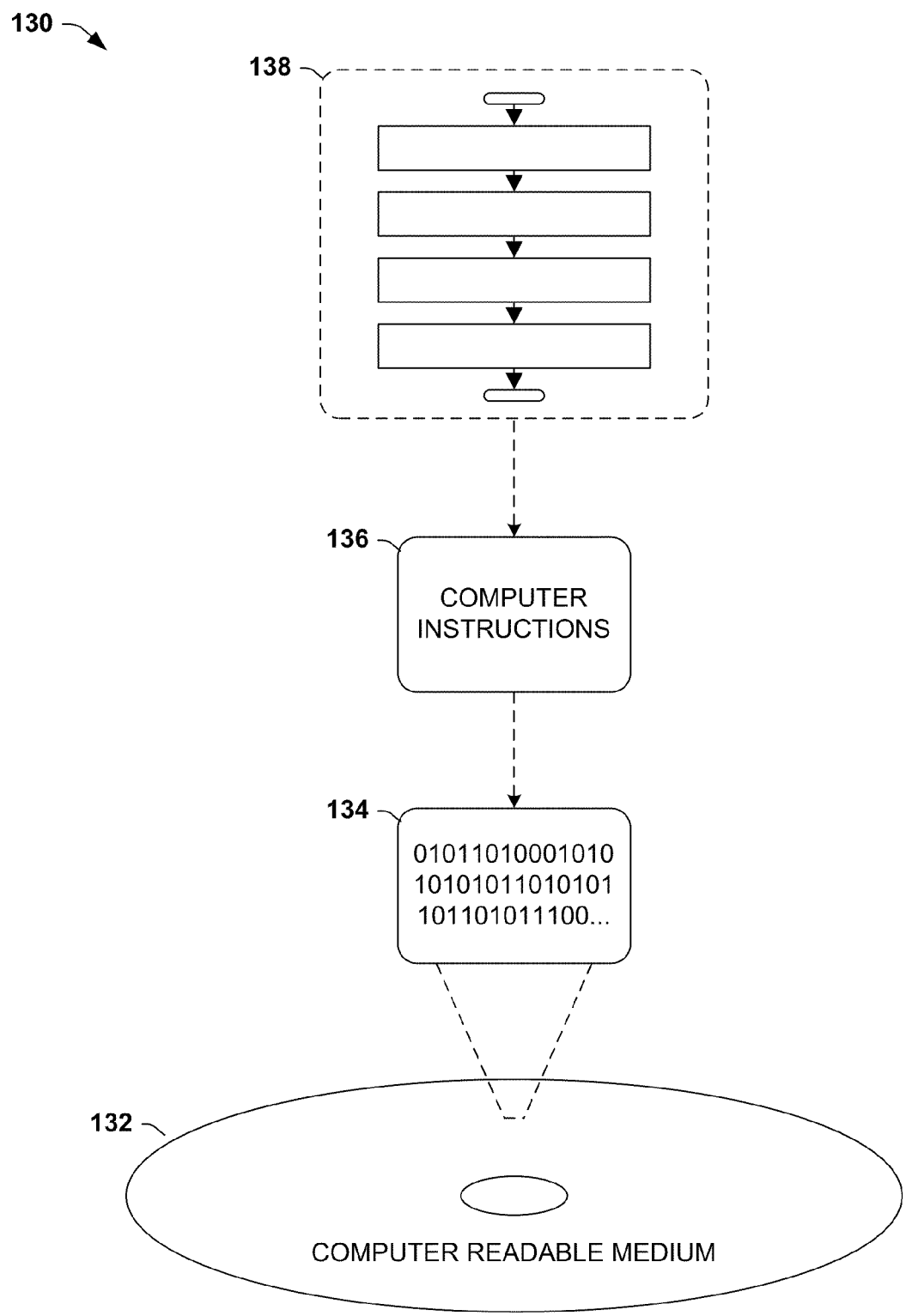
FIG. 7 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 7, wherein the implementation 130 comprises a computer-readable medium 132 (e.g., a CD-R, DVD-R, or a platter of a hard disk drive), on which is encoded computer-readable data 134. This computer-readable data 134 in turn comprises a set of computer instructions 136 configured to operate according to the principles set forth herein. In one such embodiment, the processor-executable instructions 136 may be configured to perform a method of establishing a communication session with a target device, such as the exemplary method 90 of FIG. 5. In another such embodiment, the processor-executable instructions 136 may be configured to perform a method of establishing a communication session with a source device, such as the exemplary method 110 of FIG. 6. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 90 of FIG. 5 and the exemplary method 110 of FIG. 6) to confer individual and/or synergistic advantages upon such embodiments.

A first aspect that may vary among embodiments of these techniques relates to the scenarios wherein these techniques presented herein may be utilized. As a first example, the techniques may be utilized to establish secure communication sessions in an efficient (and low-latency) manner among computers connected via a wired network, such as the internet or a local area network (LAN) or a wireless network, such as a cellular network. The techniques may also be utilized to establish secure communication sessions in an efficient (and low-latency) manner among devices connected via a wired or wireless device network, such as a Universal Serial Bus (USB) hub or a personal area network (PAN) such as Bluetooth. The devices may also be operated by the same user or by different users. As a second example, the techniques may be utilized to establish many types of communication sessions, including a server/client arrangement where the source device 12 operating as a client that endeavors to contact the target device 14 operating as a server, and a peer-to-peer arrangement where the source device 12 and target device 14 operate as peers in a distributed data sharing scheme. Further embodiments of these techniques may connect more than two devices; e.g., a multicast communication session among a source device 12 and a set of target devices 14 (each using the same shared key pair, or each having an individual key pair, etc.) may be established using some variations of the techniques discussed herein. As a third example, many types of encryption algorithms may be used to generate the asymmetric cryptographic key pair, to encrypt and decrypt messages 52 using the key pairs.

A particular scenario wherein these techniques may be utilized involves an exchange of messages among devices represented in a deployable computing environment. Recent attempts have been made to develop techniques for providing access to a computing environment among an array of devices in a consistent, deployable, and extensible manner. These techniques also seek to provide a common set of applications among the cooperating devices, and a centralized service for managing the procuring, installing, using, and uninstalling of applications among such devices. The application set is not necessarily identical among various devices; e.g., a workstation may contain high-performance applications (e.g., photo editing software and graphically intensive games) that may not run well on a cellphone device, and the cellphone device may include portability applications (e.g., a GPS-based mapping software) that is not relevant to a non-portable workstation. However, many applications and data objects related thereto may be shared among such devices (e.g., a calendar application configured to manage a user calendar object), and the computing environment may be adapted to enable the distribution and synchronization of the application and data objects among such devices. It may therefore be appreciated that a computer system may be advantageously represented in a manner that enables the deployment of the computing environment among a set of devices.

In one such technique, the computing environment—including a set of applications, the application resources, and data objects used thereby—is represented in a manner that may be delivered to devices for rendering according to the capabilities of the device. The objects include the data objects of the computer system, such as the user files and data created by the user, as well as representations of the myriad devices comprising the computing environment of the user. A computing environment represented in this manner may be delivered to any device and rendered in a manner suitable for the capabilities of the device. For instance, a workstation may render the information as a robust and general-purpose computing environment, while a public workstation may render a different computing environment experience through a web browser (e.g., as a virtual machine that may be discarded at the end of the user's session), and a cellphone may provide a leaner interface with quicker access to cellphone-related information (e.g., contacts, calendar, and navigation data.) Moreover, updates to the information set (e.g., preference changes and updates to data files contained therein) may be applied to the canonical source of the information set, and thereby propagated to all other devices to which the information set is delivered.

Figure 8:
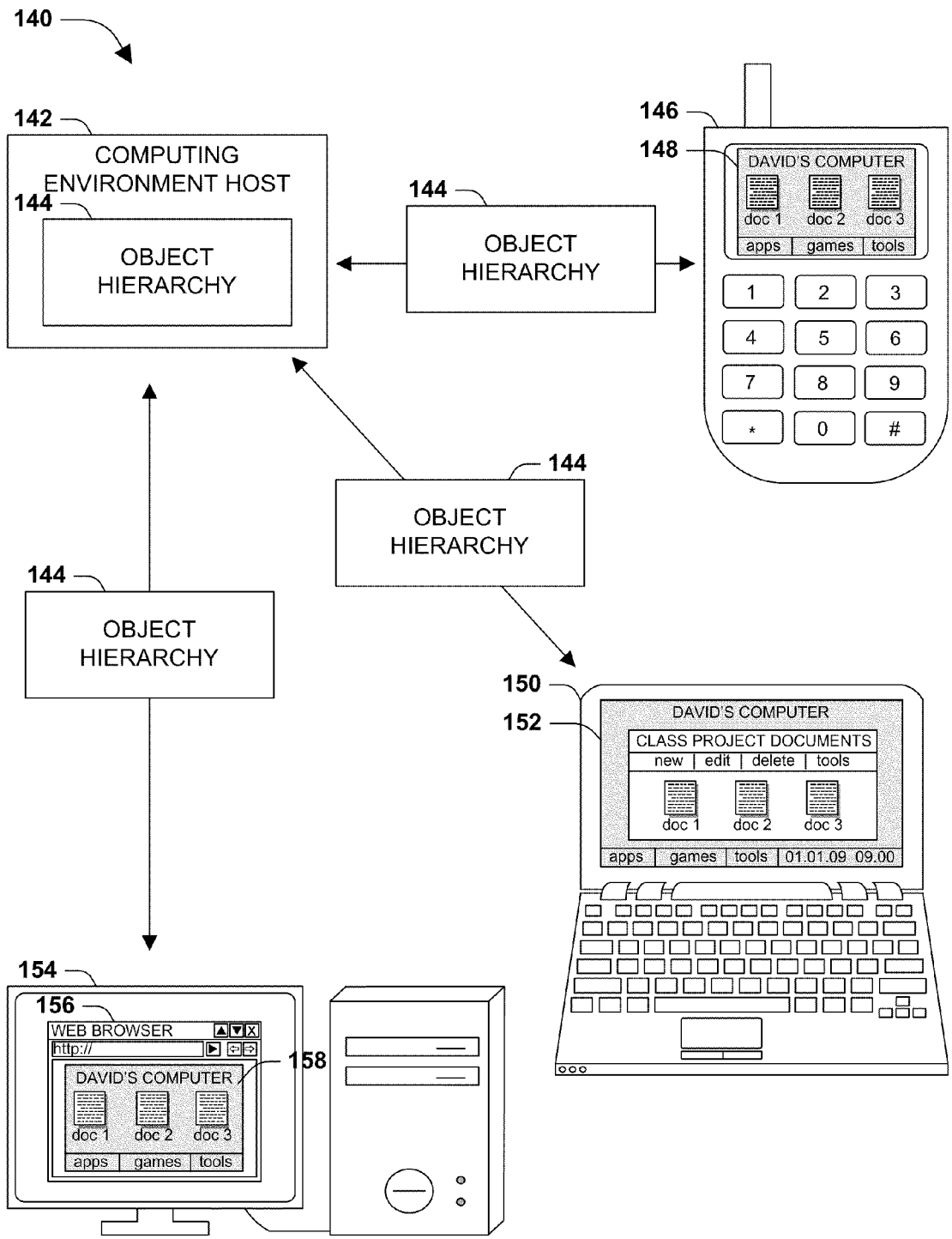
FIG. 8 is an illustration of a set of devices represented within a deployable computing environment that may establish communication sessions according to the techniques discussed herein.

FIG. 8 illustrates one such scenario 140, wherein the computing environment may be hosted by a computing environment host 142, which may store and manage an object hierarchy 144. The computing environment host 142 may also render the object hierarchy 144 in different ways on behalf of various devices, such as a cellphone device 146, a personal notebook computer 150, and a public workstation 154, and also on behalf of different types of users having different access privileges. Updates to the computing environment may be propagated back to the computing environment host 142, and may be automatically synchronized with other devices. Hence, the computing environment may therefore be devised and presented as a cloud computing architecture, comprising a device-independent representation (a "cloud") expressed as a consistent rendering across all devices ("clients") that form a mesh of cooperating portals (with device-specific properties) to the same computing environment. With respect to the techniques discussed herein, the devices represented in the object hierarchy 144 may establish communication sessions 32 in a secure and efficient manner using the techniques discussed herein. Those of ordinary skill in the art may devise many scenarios wherein the techniques discussed herein may be utilized.

A second aspect that may vary among embodiments of these techniques relates to the manner of obtaining the target public certificate 72 of the target device 14, which the source device 12 may use to encrypt the session invite 82. In one implementation, the target public certificate 72 may be obtained from a certificate server that may be configured to store various public certificates, including the target public certificate 72. For example, a large organization may implement a certificate server that contains public certificates of various known devices used by the organization, such as computers accessible over a local area network (LAN). In one such embodiment, a computing environment host 142 wherein such devices are represented may be configured to store the target public certificate 72 within the object hierarchy 144, which may be readily accessible to the source device 12. A source device 12 operating on the network may endeavor to establish a communication session with a particular target device 14 by first querying the certificate server for the public certificate of the target device 14, and then using the provided public certificate to encrypt the session invite 82. This technique thereby authenticates the target device 14 if a corresponding response is received, since other devices are unable to decrypt the session invite 82 without access to a target certificate private key 70 corresponding to the provided target public certificate 72. However, a certificate server might represent a security weak point, since, if compromised by a third party, the authentication of a large number of devices may be forged by the third party; additionally, the certificate server may itself have to be authenticated. As an alternative technique, target public certificates 72 of various devices may be provided to the source device 12 by any suitable channel, e.g., email, file transfer, or physical storage medium. Regardless of how the source device 12 achieves access to the target public certificate 72, the techniques discussed herein may be utilized accordingly. Conversely, in some embodiments, if the target device 14 is configured to establish communication sessions 32 only with known source devices 12, the target device 14 may refer to a source public certificate (which might also be provided by a certificate server 162) to authenticate the source device 12 during the handshake.

An additional refinement of these techniques relates to the caching of public certificates. For example, a source device 12 may comprise a certificate cache, wherein target public certificates 72 obtained during an initiation of a communication session 32 (e.g., from a certificate server) may be stored, and may later utilized to reauthenticate the target device 14 while initiating a subsequent communication session with the same target device 14. This caching may further improve the efficiency of these techniques by reducing redundant retrievals of the target public certificate 72 of a particular device 14. The cache may also be maintained to promote security, e.g., by establishing a validity period for respective target public certificates 72, and evicting expired target public certificates 72 from the certificate cache.

Figure 9:
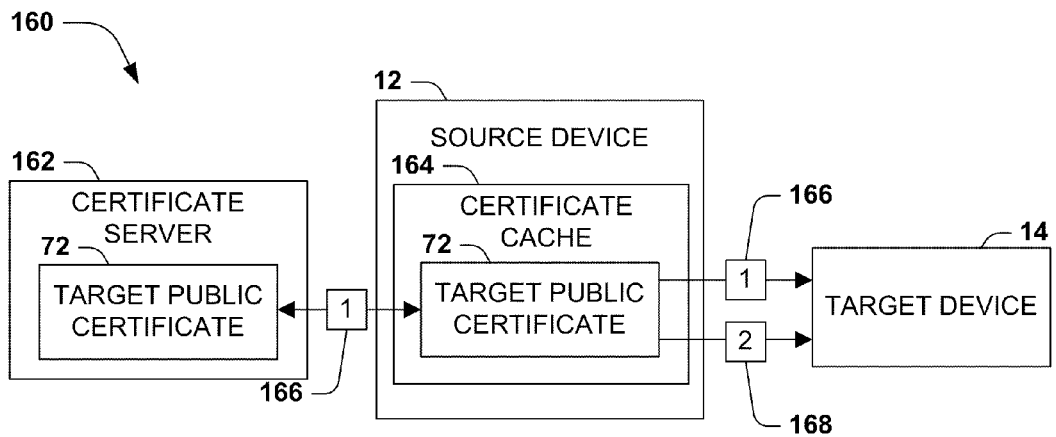
FIG. 9 is an illustration of an exemplary scenario featuring a certificate server configured to store public certificates that may be accessed by a source device and/or target device while establishing a communication session.

FIG. 9 presents an exemplary scenario 160 featuring some of these variations of this second aspect in conjunction with the techniques discussed herein. In this exemplary scenario 160, a certificate server 162 may be configured to store public certificates, including the target public certificate 72 of a particular target device 14. A source device 12 having access to the certificate server 162 may endeavor to initiate a first communication session 166 with the target device 14, and may therefore query the certificate server 162 to obtain the target public certificate 72. However, the source device 12 may also comprise a certificate cache 164 configured to store public certificates, and upon obtaining the target public certificate 72 of the target device 14, the source device 12 may be configured to store the target public certificate 72 of the target device 14 in the certificate cache 164. The source device 12 may then utilize the target public certificate to authenticate the target device 14 while establishing the first communication session 166. Subsequently (e.g., after the first communication session 166 has ended), the source device 12 may endeavor to initiate a second communication session 168 with the target device 14. Rather than reacquiring the target public certificate 72 from the certificate server 162, the source device 12 may retrieve the target public certificate 72 from the certificate cache 164, which may be utilized to reauthenticate the target device 14 while establishing the second communication session 168. This caching may therefore improve the efficiency of establishing the second communication session 168 by avoiding the redundant acquisition of the target public certificate 72. Those of ordinary skill in the art may devise many techniques for implementing the delivery and use of public certificates while implementing the techniques discussed herein.

A third aspect that may vary among embodiments of these techniques relates to the manner of developing the session key 86 used to encrypt the communication session 32 established between the source device 12 and the target device 14 after the handshake. As a first example, the session key 86 might comprise a symmetric key, which might be randomly generated and utilized according to a symmetric encryption algorithm (e.g., the Rijndael algorithm), whereby the same key is used to encrypt and to decrypt messages. A symmetric key might be desirable for securing the communication session 32, because the computational burdens of using such a key may be considerably lower than using an asymmetric key. The session key 86 might then be generated, e.g., by generating a source session key 74 comprising a first randomly generated key (such as a randomly selected integer or string), generating a target session key 76 comprising a second randomly generated key, and generating a symmetric random session key using the first randomly generated key and the second randomly generated key (e.g., by concatenating the randomly generated keys.)

As a second example, a set of session keys might be generated. Because symmetric keys might be easier to break than asymmetric keys, it might be desirable to rotate through a set of keys during the communication session 32 (e.g., where the source device 12 and the target device 14 are configured to switch periodically to a next key in a session key set.) For example, the session key 86 may be generated as a session key set comprising at least two session keys, each of which is different from the other session keys, but nevertheless generated (in different ways) using the source session key and the target session key. Upon initiation, the communication session 32 may initially be encrypted a first session key, and the devices may be configured in some manner (e.g., periodically) to select a second session key from the session key set and to encrypt the communication session 32 using the second session key. Those of ordinary skill in the art may devise many ways of generating and using the session key while implementing the techniques discussed herein.

A fourth aspect that may vary among embodiments of these techniques relates to the manner of initiating the communication session. As a first example, the source device 12 may initiate the communication session 32 with the target device 14 after receiving the session acceptance 84. As a second example, the target device 14 may instead initiate the communication session 32 with the source device 12 after sending the session acceptance 84. As a third example, the target device 14 might initiate the communication session 32 even before sending the session acceptance 84, and may instead send the session acceptance 84 after establishing the communication session 32. This technique might effectively permit the devices to establish the communication session after sending only a single message; e.g., the source device 12 might send the session invite 82 to the target device 14, and might then be configured to await the initiation of the communication session 32 by the target device 14, with the session acceptance 84 to follow within the communication session 32. Those of ordinary skill in the art may devise many ways of initiating the communication session between the devices while implementing the techniques discussed herein.

A fifth aspect that may vary among embodiments of these techniques relates to scenarios involving the establishment of communication sessions 32 among devices operated by different users. Where devices are operated by the same user, comparatively few identity-based security concerns may be involved; but where the source device 12 is operated by a source user and the target device 14 is operated by a target user, one or both users may wish to authenticate the identities of the other users before initiating the communication session 32. For example, the target user may have configured the target device 14 to share data only with a particular set of source users 12 of source devices 14, and may therefore configure the target device 14 to refuse to establish communication sessions 32 with unknown or known but unauthenticated users. In one such embodiment, the session invite 82 provided by the source device 12 may include a source user authenticator, such as a password or cryptographic signature, which may authenticate the identity of the source user of the source device 12. The target device 14 may therefore be configured to verify the source user using the source user authenticator, and to initiate the communication session 32 with the source device 12 after authenticating the source user. Conversely, the session acceptance 84 provided by the target device 14 may include a target user authenticator, which may authenticate the identity of the target user of the target device 14; and the source device 12 may be configured to verify the target user using the target user authenticator, and to initiate the communication session 32 with the target device 14 after authenticating the target user. Those of ordinary skill in the art may devise many techniques for authenticating users while implementing the techniques discussed herein.

A sixth aspect that may vary among embodiments of these techniques relates to scenarios where one or both of the source device 12 and the target device 14 are accessible at multiple addresses. In a first such scenario, a source device 12 and a target device 14 may be concurrently capable of accessing each other across multiple networks, such as a personal area network (PAN) such as a Bluetooth network, a local area network (LAN) such as an 802.11 (WiFi) network, and a wide area network (WAN) such as the internet. The physical network may also comprise other types of networks, such as super-peer networks where a node may operate as a server, a client, and/or one or more peers with respect to other peers. In a second scenario, the target device 14 may be accessible at a range of addresses, and it may be preferable for the source device 12 to contact the target device 14 using a particular address as compared with other addresses (e.g., an HTTP channel accessed through port 80 instead of an FTP channel accessed through port 21.) In these and other scenarios, the source device 12 may disclose to the target device 14 (e.g., as part of the session invite 82) a set of source candidate addresses where the source device may be accessible, and while establishing the communication session 32, the target device 14 may select a source address 76 from among the source candidate addresses, and may initiate the communication session 32 with the selected source address 76. Conversely or additionally, the target device 14 may disclose to the source device 12 (e.g., as part of the session acceptance 84) a set of target candidate addresses where the target device may be accessible, and while establishing the communication session 32, the source device 12 may select a target address 80 from among the source candidate addresses, and may initiate the communication session 32 with the selected source address 80.

In a second variation of this sixth aspect, it may be desirable for one or both devices to use a first address during the handshake process, and a second (different) address during the communication session. For example, if one or both devices engage in the handshake using addresses that are associated with the devices, an eavesdropper of the handshake process might be able to use these addresses to identify the locations of the devices, to identify the transaction between the devices, and/or to interfere with the communication session, such as with a denial-of-service attack. Instead, one or both devices might endeavor to use one address (e.g., an anonymized address) to engage in the handshake process, and to use another address (e.g., a non-anonymized address) to engage in the communication session once authenticated and securely established. For example, the session acceptance 84 might comprise a candidate target address that is different from the target address 80 of the target device 14 to which the source device 12 sends the session invite 82, and the source device 12 might initiate the communication session 32 with the target device 14 at the candidate target address. Conversely, the session invite 82 might comprise a candidate source address that is different from the source address 78 of the source device 12 from which the session invite 82 is sent, and the source device 12 might initiate the communication session 32 with the target device 14 from the candidate source address. In one such scenario, an anonymizing server may permit devices to claim an ephemeral address in order to handshake with another device. It may be appreciated that this anonymization might be feasible without diminishing the authentication by each device of the identity of the other device or user thereof; e.g., even though a device might use an anonymized address, it might nevertheless be authenticated through a public certificate. Those of ordinary skill in the art may devise many ways of disclosing, selecting among, and utilizing a plurality of addresses whereby the source device 12 and/or target device 14 may be accessible while implementing the techniques discussed herein.

A seventh aspect that may vary among embodiments of these techniques relates to the use of one or more nonces to improve the security of the communication channel 32. A nonce is a distinctive identifier generated by the source device 12 and/or the target device 14 and included in messages 52 to distinctively identify the message 52, the communication session 32, etc. The use of a nonce may make "replay attacks" more difficult, where a third party may capture an encrypted message generated by a sender and may retransmit the encrypted message to the receiver in order to compromise the security of the communication session 32 or alter the behavior of the receiving device. As a first example, the source device 12 may be configured to generate a source nonce (e.g., a random or sequential number or string), which it may include in the session invite 82, that distinctively identifies the session invite 82. Upon receiving the session invite 82, the target device 14 may be configured to verify the source nonce (e.g., by confirming that it has not previously received a session invite 82 having the same source nonce.) Upon verifying the source nonce, the target device 14 may transmit the session acceptance 84 to the source device 12, and may record the source nonce in a set of previously received source nonces. Additionally, the target device 14 may include the source nonce in the session acceptance 84, which may further authenticate the identity of the target device 14 as responding to the session invite 82 (e.g., a third party may endeavor to impersonate the target device 14 by replaying a previously received session acceptance 84, but a mismatching source nonce in the session acceptance 84 may alert the source device 12 of the impersonation.) Alternatively or additionally, the target device 14 may generate a target nonce that may be included in the session acceptance 84, and upon receiving the session acceptance 84, the source device 12 may verify the target nonce before initiating the communication session 32 with the target device 14.

Figure 10:
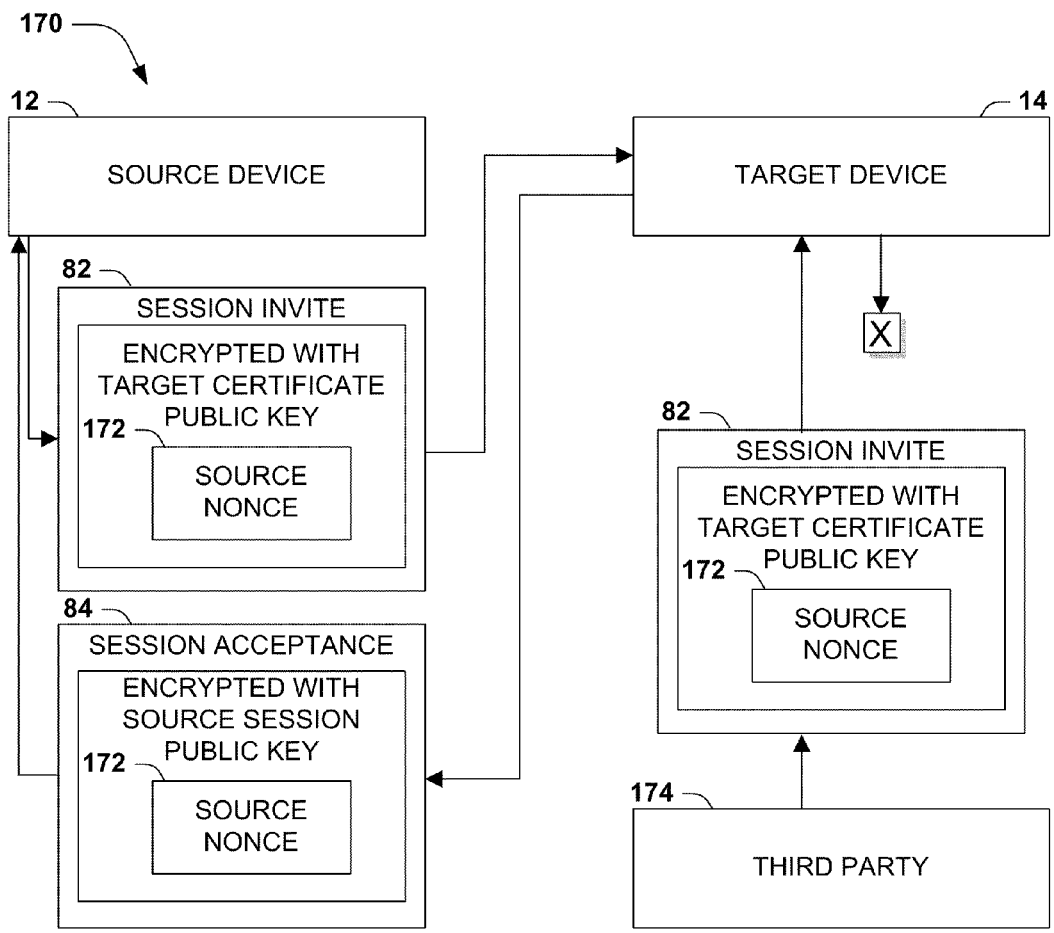
FIG. 10 is an illustration of an exemplary scenario featuring an establishment of a communication session between a source device and a target device utilizing a source nonce.

FIG. 10 presents an exemplary scenario 170 featuring a source device 12 and a target device 14 that endeavor to establish a communication session 32 according to the techniques presented herein, and also featuring the use of a source nonce 172. The source device 12 may request to initiate a communication session 32 by generating and sending to the target device 14 a session invite 82 encrypted with the target public certificate 72. However, the session invite 82 may comprise (in addition to the other elements) a source nonce 172, such as a randomly generated number. The target device 14 may receive the session invite 82 and confirm that it has not previously received a session invite 82 featuring the source nonce 172. Upon successfully confirming the source nonce 172, the target device 14 may generate and send to the source device 12 a session acceptance 84, encrypted with the source public certificate 66, and comprising (in addition to the other elements) the source nonce 172. The source device 12 may verify that the source nonce 172 received in the session acceptance 84 matches the source nonce 172 sent in the session invite 82 before initiating the communication session 32.

The inclusion of the source nonce 172 in this exemplary scenario 170 of FIG. 10 may improve the security of the communication session 32 in at least two ways. First, a third party 174 may intercept the session invite 82, and may subsequently attempt to initiate a separate communication session 32 with the target device 14 by retransmitting the session invite 82 to the target device 14, thereby impersonating the source device 12. The target device 14 may identify the source nonce 172 included in the retransmitted session invite 82 as having been previously received in the first transmission of the session invite 82 by the source device 12, and may therefore deny the initiation of a communication session 32 with the third party 174. Second, the third party 174 may capture a session acceptance 84 transmitted from the target device 14 to the source device 12 during an initiation of a first communication session. During a subsequent attempt by the source device 12 to establish a second communication session with the target device 14, the third party 174 may then attempt to impersonate the target device 14 by retransmitting the session acceptance 84, but the source nonce 172 in the second session invite 82 will fail to match the source nonce 172 returned by the third party 174 in the retransmitted session acceptance 84, thereby alerting the source device 12 to the impersonation. Those of ordinary skill in the art may devise many uses for nonces generated by the source device 12 and/or the target device 14 while implementing the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
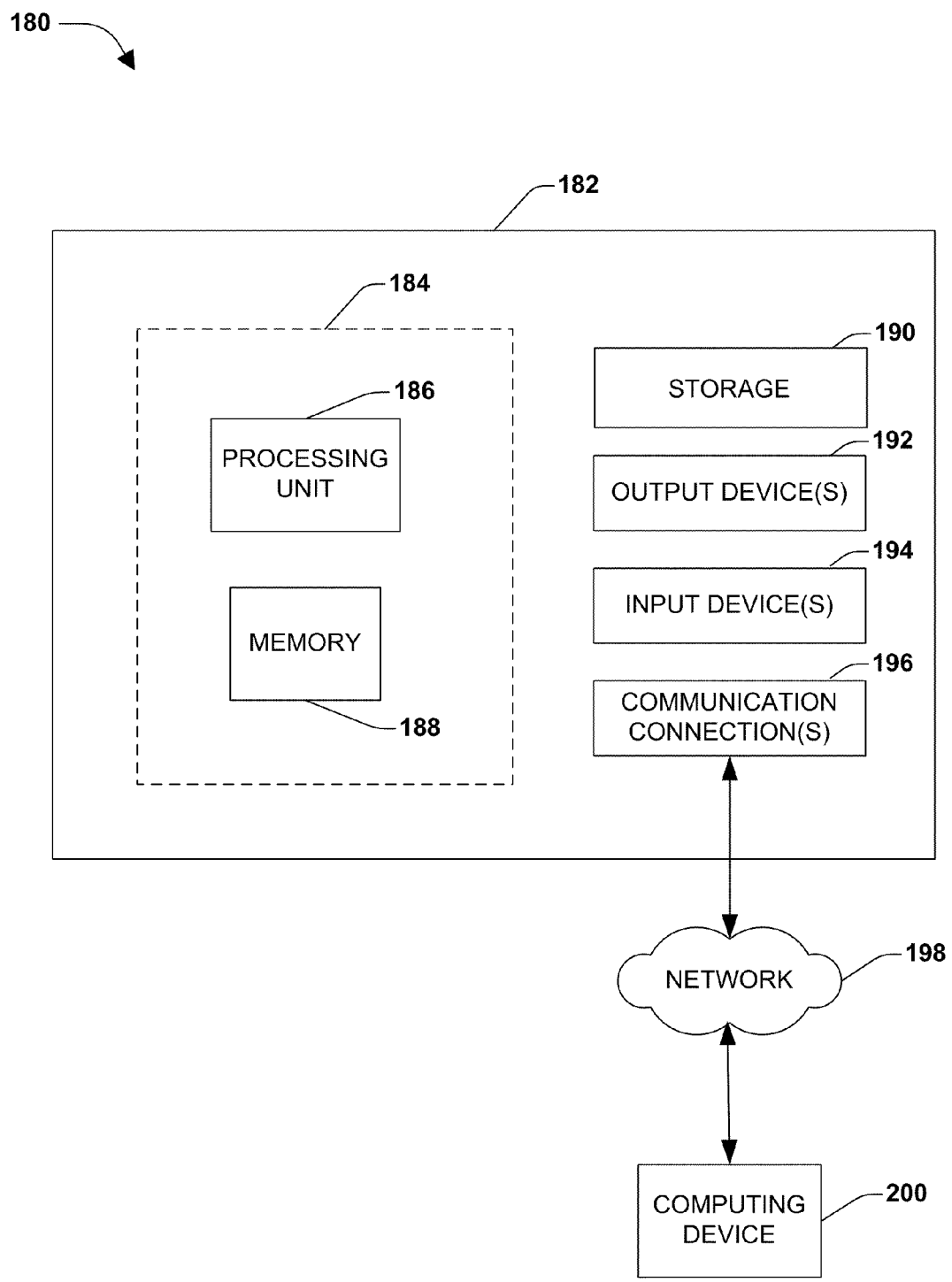
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 180 comprising a computing device 182 configured to implement one or more embodiments provided herein. In one configuration, computing device 182 includes at least one processing unit 186 and memory 188. Depending on the exact configuration and type of computing device, memory 188 may be volatile (such as RAM, for example), non-volatile (such as ROM, flash memory, etc., for example) or some combination of the two. This configuration is illustrated in FIG. 11 by dashed line 184.

In other embodiments, device 182 may include additional features and/or functionality. For example, device 182 may also include additional storage (e.g., removable and/or non-removable) including, but not limited to, magnetic storage, optical storage, and the like. Such additional storage is illustrated in FIG. 11 by storage 190. In one embodiment, computer readable instructions to implement one or more embodiments provided herein may be in storage 190. Storage 190 may also store other computer readable instructions to implement an operating system, an application program, and the like. Computer readable instructions may be loaded in memory 188 for execution by processing unit 186, for example.

The term "computer readable media" as used herein includes computer storage media. Computer storage media includes volatile and nonvolatile, removable and non-removable media implemented in any method or technology for storage of information such as computer readable instructions or other data. Memory 188 and storage 190 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 182. Any such computer storage media may be part of device 182.

Device 182 may also include communication connection(s) 196 that allows device 182 to communicate with other devices. Communication connection(s) 196 may include, but is not limited to, a modem, a Network Interface Card (NIC), an integrated network interface, a radio frequency transmitter/receiver, an infrared port, a USB connection, or other interfaces for connecting computing device 182 to other computing devices. Communication connection(s) 196 may include a wired connection or a wireless connection. Communication connection(s) 196 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 182 may include input device(s) 194 such as keyboard, mouse, pen, voice input device, touch input device, infrared cameras, video input devices, and/or any other input device. Output device(s) 192 such as one or more displays, speakers, printers, and/or any other output device may also be included in device 182. Input device(s) 194 and output device(s) 192 may be connected to device 182 via a wired connection, wireless connection, or any combination thereof. In one embodiment, an input device or an output device from another computing device may be used as input device(s) 194 or output device(s) 192 for computing device 182.

Components of computing device 182 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 182 may be interconnected by a network. For example, memory 188 may be comprised of multiple physical memory units located in different physical locations interconnected by a network.

Those skilled in the art will realize that storage devices utilized to store computer readable instructions may be distributed across a network. For example, a computing device 200 accessible via network 198 may store computer readable instructions to implement one or more embodiments provided herein. Computing device 182 may access computing device 200 and download a part or all of the computer readable instructions for execution. Alternatively, computing device 182 may download pieces of the computer readable instructions, as needed, or some instructions may be executed at computing device 182 and some at computing device 200.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of establishing a communication session by a source device having a source address, at least one source candidate address, a processor, and a source private key with a target device having a target public certificate, the method comprising:

executing on the processor of the source device instructions configured to:
      generate a source session key;

transmit to the target device from the source address a session invite comprising at least one source candidate address that is different from the source address and the source session key, the session invite encrypted using the target public certificate; and upon receiving from the target device a session acceptance comprising a target address and a target session key:

decrypt the session acceptance using the source private key;

generate a session key using the source session key and the target session key; and initiate the communication session with the target device at the target address and from one of the source candidate addresses, the communication session encrypted using the session key.

2. The method of claim 1, the source device and the target device represented in a deployable computing environment hosted by a computing environment host.

3. The method of claim 1:

the source session key comprising a first randomly generated key;

the target session key comprising a second randomly generated key; and the session key comprising a symmetric random session key generated using the first randomly generated key and the second randomly generated key.

4. The method of claim 1:

generating the session key comprising: generating a session key set comprising at least two session keys, respective session keys generated using the source session key and the target session key and different from the other session keys in the session key set;

initiating the communication session comprising: initiating the communication session with the target device at the target address, the communication session encrypted using a first session key; and the method comprising: after initiating the communication session:

selecting a second session key from the session key set, and encrypting the communication session using the second session key.

5. The method of claim 1:

the source device operated by a source user;

the target device operated by a target user;

the session acceptance comprising a target user authenticator, and initiating the communication session comprising:

verifying the target user using the target user authenticator, and upon verifying the target user, initiating the communication session with the target device, the communication session encrypted using the session key.

6. The method of claim 1:

the source device comprising a certificate cache;

the instructions configured to:

upon obtaining the target public certificate of the target device, store the target public certificate in the certificate cache, and establish a subsequent communication session with the target device by retrieving the target public certificate from the certificate cache.

7. The method of claim 1:

the source device accessible at at least two candidate source addresses; and the session invite comprising the at least two candidate source addresses.

8. The method of claim 1:

the session acceptance comprising at least two candidate target addresses, and initiating the communication session with the target device comprising:

selecting at least one target address among the at least two candidate target addresses, and initiating the communication session with the target device at at least one selected target address, the communication session encrypted using the session key.

9. The method of claim 1:

the instructions configured to generate a source nonce, and the session invite comprising the source nonce.

10. The method of claim 1:

the session acceptance comprising a target nonce; and initiating the communication session comprising:

verifying the target nonce, and upon verifying the target nonce, initiating the communication session with the target device, the communication session encrypted using the session key.

11. A method of establishing a communication session by a target device having a processor and a target private key with a source device having a source public certificate, the method comprising:

executing on the processor of the target device instructions configured to:

upon receiving from the source device, from a source address, a session invite comprising a source session key and at least one source candidate address that is different from the source address:

decrypt the session invite using the target private key;

generate a target session key comprising a target session key;

generate a session key using the source session key and the target session key; and transmit to the source device a session acceptance comprising a target address and the target session key, the session acceptance encrypted using the source public certificate; and upon receiving from the source device an initiation of a communication session, initiate the communication session with the source device at one of the source candidate addresses, the communication session encrypted using the session key.

12. The method of claim 11:

the source device operated by a source user;

the target device operated by a target user;

the session invite comprising a source user authenticator, and the instructions configured to, upon receiving the session invite:

verify the target user using the target user authenticator, and upon verifying the target user, transmit to the source device the session acceptance.

13. The method of claim 11:

the session invite comprising at least two candidate source addresses;

the instructions configured to, upon receiving the session invite:

select at least one source address of the at least two candidate source addresses, and transmit the session acceptance to the source device at at least one selected source address; and the communication session initiated by the source device from at least one source address.

14. The method of claim 11:
the target device accessible at at least two candidate target addresses;
the session acceptance comprising the at least two candidate target addresses; and
the communication session initiated by the source device to at least one candidate target address.

15. The method of claim 11:
the session invite comprising a source nonce; and
the instructions configured to, upon receiving the session invite:
  verify the source nonce, and
  upon verifying the source nonce, transmit the session acceptance to the source device.

16. The method of claim 11:
the instructions configured to generate a target nonce, and
the session acceptance comprising the target nonce.

17. The method of claim 11, comprising: initiate the communication session with the source device at the source address, the communication session encrypted using the session key.

18. A nonvolatile computer-readable storage device comprising instructions that, when executed on a processor of a source device operated by a source user and comprising a certificate cache and a source private key and having at least one source address, represented in a deployable computing environment hosted by a computing environment host and also representing a target device operated by a target user and having at least one target address, the source device having access to a certificate server comprising at least one public certificate including a target public certificate identifying the target device, establish a communication session with the target device by:
  obtaining the target public certificate of the target device from the certificate server;
  storing the target public certificate in the certificate cache;
  generating a source session key;
  generating a source nonce;
  transmitting to the target device a session invite comprising the at least one source address, the source session key, and the source nonce, the session invite encrypted using the target public certificate;
  upon receiving from the target device a session acceptance comprising at least one candidate target address, a target session key, a target nonce, and a target user authenticator:
    decrypting the session acceptance using the source private key;
    verifying the target nonce;
    verifying the target user using the target user authenticator; and
    upon verifying the target user and the target nonce:
      selecting at least one target address among the at least two candidate target addresses,
      generating a session key using the source session key and the target session key, and
      initiating the communication session with the target device at a selected target address, the communication session encrypted using the session key; and
  establishing a subsequent communication session with the target device by retrieving the target public certificate from the certificate cache.

19. The method of claim 1:
the source address comprising an anonymized address that is not publicly associated with the source device; and
the source candidate address comprising a non-anonymized address that is publicly associated with the source device.

20. The method of claim 11:
the target address comprising an anonymized address that is not publicly associated with the target device; and
the target candidate address comprising a non-anonymized address that is publicly associated with the target device.

* * * * *